United States Patent
Lethellier et al.

(10) Patent No.: US 10,978,914 B2
(45) Date of Patent: Apr. 13, 2021

(54) VAULT FOR WIRELESS POWER TRANSFER PAD WITH INTEGRATED JUNCTION BOX

(71) Applicant: Wireless Advanced Vehicle Electrification, Inc., Salt Lake City, UT (US)

(72) Inventors: Patrice Lethellier, Herriman, UT (US); Ryan Calder, Saratoga Springs, UT (US); Evans Griego, Murray, UT (US); Steve Ball, Sandy, UT (US); Marcellus Harper, Kaysville, UT (US)

(73) Assignee: Wireless Advanced Vehicle Electrification, Inc., Salt Lake City, UT (US)

(*) Notice: Subject to any disclaimer, the term of this patent is extended or adjusted under 35 U.S.C. 154(b) by 106 days.

(21) Appl. No.: 16/277,695

(22) Filed: Feb. 15, 2019

(65) Prior Publication Data
US 2019/0252922 A1 Aug. 15, 2019

Related U.S. Application Data

(60) Provisional application No. 62/631,206, filed on Feb. 15, 2018.

(51) Int. Cl.
| | | |
|---|---|---|
| *H02J 50/12* | (2016.01) | |
| *H02J 50/40* | (2016.01) | |
| *H01F 27/28* | (2006.01) | |
| *H01F 38/14* | (2006.01) | |
| *H02J 50/70* | (2016.01) | |
| *H01F 27/10* | (2006.01) | |
| *H01F 27/36* | (2006.01) | |

(52) U.S. Cl.
CPC .............. *H02J 50/12* (2016.02); *H01F 27/28* (2013.01); *H01F 38/14* (2013.01); *H02J 50/40* (2016.02); *H01F 27/10* (2013.01); *H01F 27/36* (2013.01); *H02J 50/70* (2016.02)

(58) Field of Classification Search
CPC ....................................... H02J 50/12
USPC ......................................... 307/104
See application file for complete search history.

(56) References Cited

U.S. PATENT DOCUMENTS

2018/0361863 A1* 12/2018 Islinger ................ B60L 53/122

* cited by examiner

*Primary Examiner* — Joseph Chang
(74) *Attorney, Agent, or Firm* — Kunzler Bean & Adamson, PC; Bruce R. Needham

(57) ABSTRACT

A vault apparatus for wireless power transfer includes a vault comprising an opening for a wireless power transfer ("WPT") pad. The opening is located on a top of the vault. The vault apparatus includes a junction box formed into the vault. The junction box includes an opening oriented toward the top of the vault. The vault apparatus includes a sealing ring that maintains a WPT pad fixed in the vault where a portion of the sealing ring covers the junction box.

20 Claims, 8 Drawing Sheets

Section A-A'

Enlargement B

Enlargement C

Section A-A'

Enlargement B

Enlargement C

US 10,978,914 B2

VAULT FOR WIRELESS POWER TRANSFER PAD WITH INTEGRATED JUNCTION BOX

CROSS-REFERENCES TO RELATED APPLICATIONS

This application claims the benefit of U.S. Provisional Patent Application No. 62/631,206 entitled "VAULT FOR WIRELESS POWER TRANSFER PAD WITH INTEGRATED JUNCTION BOX" and filed on Feb. 15, 2018 for Patrice Lethellier et al., which is incorporated herein by reference for all purposes.

FIELD

This invention relates to wireless power transfer and more particularly relates to a wireless power transfer pad with an integrated junction box.

BACKGROUND

Fossil fuel vehicles produce pollutants and use natural resources that are typically not renewable. To reduce pollution, electric powered vehicles are becoming increasingly popular. For example, many cities are moving toward electric mass transit vehicles to reduce pollution. Mass transit vehicles powered by overhead power lines have disadvantages, such as high cost and unsightly overhead power lines. Battery powered mass transit vehicles have many advantages. However, most battery powered mass transit vehicles have batteries sized to run for an extended period between charging. A better solution is to incrementally charge mass transit vehicles at various stops along a route. Other types of vehicles may also benefit from road-mounted charging locations.

The charging locations include a wireless power transfer ("WPT") pad that transfers power wirelessly to a secondary pad located on a vehicle. Typically, in some cases the WPT pad is ground mounted and is flush to a roadway. Replacing the WPT pad can be troublesome. In addition, connecting to the WPT can also be troublesome.

SUMMARY

A vault apparatus for wireless power transfer includes a vault comprising an opening for a wireless power transfer ("WPT") pad. The opening is toward on a top of the vault. The vault apparatus includes a junction box formed into the vault. The junction box includes an opening oriented toward the top of the vault. The vault apparatus includes a sealing ring that maintains a WPT pad fixed in the vault where a portion of the sealing ring covers the junction box.

A system for wireless power transfer includes a wireless power transfer ("WPT") pad and a vault. The vault includes an opening for the WPT pad. The opening is located on a top of the vault. The vault includes a junction box formed into the vault. The junction box includes an opening oriented toward the top of the vault. The system includes a sealing ring that maintains the WPT pad fixed in the vault. A portion of the sealing ring covers the junction box.

A vault apparatus includes a vault with an opening for a WPT pad. The opening is located on a top of the vault. The vault apparatus includes a first junction box formed into the vault. The first junction box includes an opening oriented toward the top of the vault. The first junction box terminates one or more conductors of the WPT pad and conductors from a conduit coupled to the first junction box. The vault apparatus includes a second junction box that accommodates a cooling fluid connection between cooling lines of the WPT pad and supply and return lines connected to the cooling lines of the WPT pad. The vault includes a sealing ring that maintains a WPT pad fixed in the vault. A portion of the sealing ring covers the first junction box and the second junction box.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
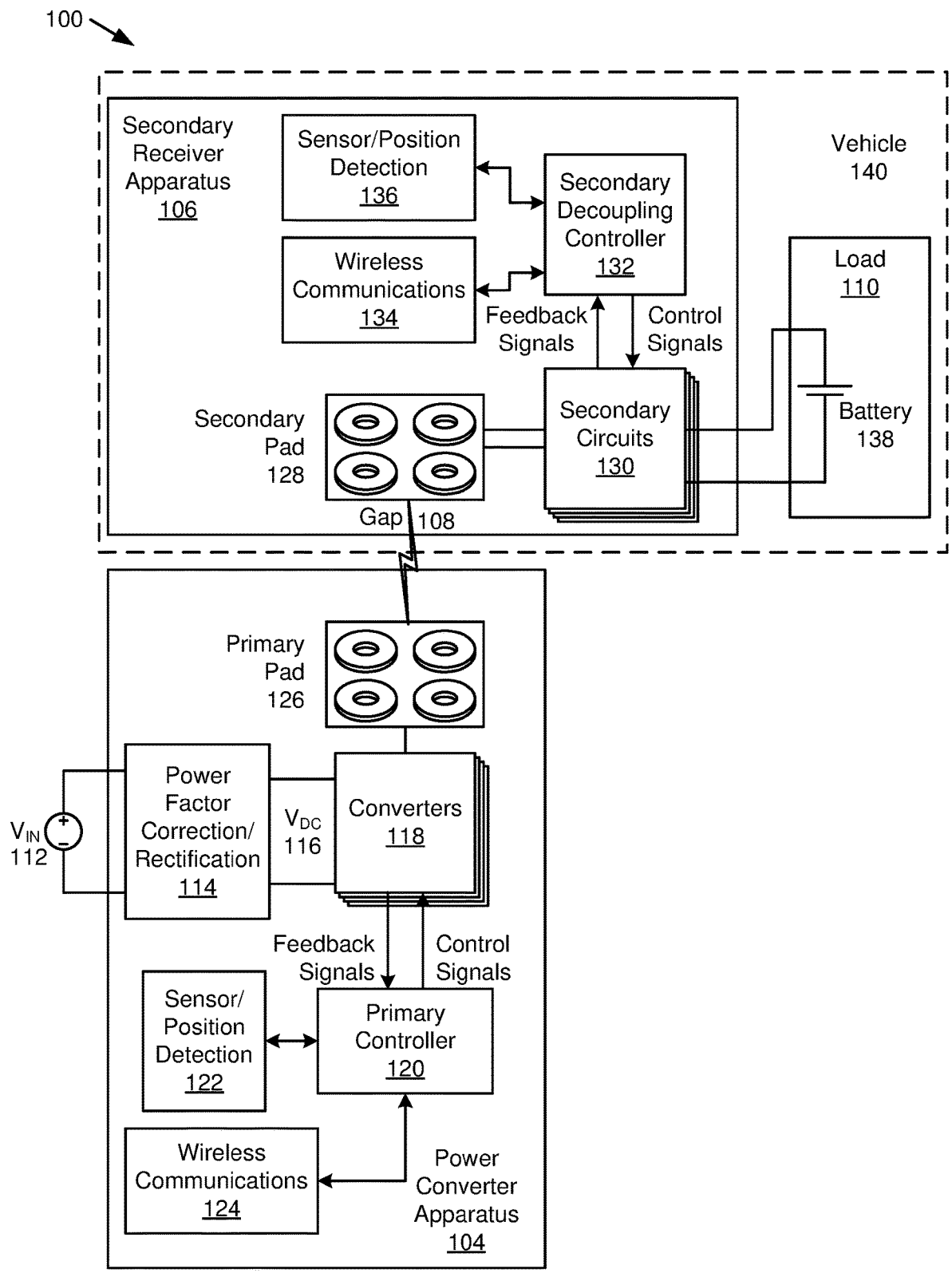
FIG. 1 is a schematic block diagram illustrating one embodiment of a system with a low voltage wireless power transfer ("WPT") pad.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A vault apparatus for wireless power transfer includes a vault comprising an opening for a wireless power transfer ("WPT") pad. The opening is toward on a top of the vault. The vault apparatus includes a junction box formed into the vault. The junction box includes an opening oriented toward the top of the vault. The vault apparatus includes a sealing ring that maintains a WPT pad fixed in the vault where a portion of the sealing ring covers the junction box.

In some embodiments, the junction box comprises a conduit entry point located on a side of the junction box. In other embodiments, the junction box includes a terminal block with a landing lug for a conductor from the WPT pad and a landing lug for a conductor entering the junction box through a conduit entering the junction box. In other embodiments, the vault includes a ledge under the sealing ring. The ledge supports the sealing ring and the sealing ring includes a seal. The seal forms a water-tight barrier between the sealing ring and the vault. In other embodiments, the portion of the sealing ring that covers the junction box extends between a ledge of the vault and the WPT pad. In other embodiments, the junction box includes a dielectric grease. The dielectric grease fills the junction box and fills space around components within the junction box. In further embodiments, the dielectric grease insulates electrified components within the junction box. In other embodiments, the dielectric grease is water repellent and repels water from reaching electrical components within the junction box surrounded by the dielectric grease.

In some embodiments, the vault includes a second junction box that accommodates a cooling fluid connection between cooling lines of the WPT pad and supply and return lines connected to the cooling lines of the WPT pad. In other embodiments, when the WPT pad is mounted in the vault and the sealing ring is mounted to the vault and is maintaining the WPT pad within the vault, a rating for vehicular traffic over the vault, WPT pad and sealing ring has an American Association of State Highway and Transportation Officials ("AASHTO") H-20 rating for heavy duty vehicular traffic. In other embodiments, a portion of the WPT pad is flush with a top surface of the vault and the WPT pad includes a recess and the sealing ring conforms to the recess. The sealing ring in the recess secures the WPT pad in the vault. In other embodiments, the vault includes a seal between the WPT pad and the sealing ring. The seal inhibits liquid from entering the vault and forms a water-tight barrier between the sealing ring and the WPT pad. In other embodiments, a top portion of the sealing ring is flush with the top surface of the vault. In other embodiments, the apparatus includes a center junction box located in a center portion of a winding of the WPT pad. The center junction box terminates one or more conductors of the WPT pad and conductors from a conduit coupled to the center junction box.

A system for wireless power transfer includes a wireless power transfer ("WPT") pad and a vault. The vault includes an opening for the WPT pad. The opening is located on a top of the vault. The vault includes a junction box formed into the vault. The junction box includes an opening oriented toward the top of the vault. The system includes a sealing ring that maintains the WPT pad fixed in the vault. A portion of the sealing ring covers the junction box.

In some embodiments, the vault includes a second junction box that accommodates a cooling fluid connection between cooling lines of the WPT pad and supply and return lines connected to the cooling lines of the WPT pad. In other embodiments, the system includes a converter, a power factor correction circuit, a rectification section and/or a direct current ("DC") bus. The converter feeds the WPT pad. In other embodiments, the WPT pad includes a primary pad and the system includes a secondary receiver apparatus with a secondary pad. The secondary receiver apparatus is connected to a load. The system transfers power wirelessly from the primary pad to the secondary pad and delivers electrical power to the load.

A vault apparatus includes a vault with an opening for a WPT pad. The opening is located on a top of the vault. The vault apparatus includes a first junction box formed into the vault. The first junction box includes an opening oriented toward the top of the vault. The first junction box terminates one or more conductors of the WPT pad and conductors from a conduit coupled to the first junction box. The vault apparatus includes a second junction box that accommodates a cooling fluid connection between cooling lines of the WPT pad and supply and return lines connected to the cooling lines of the WPT pad. The vault includes a sealing ring that maintains a WPT pad fixed in the vault. A portion of the sealing ring covers the first junction box and the second junction box.

In some embodiments, the vault includes a ledge under the sealing ring. The ledge supports the sealing ring and the sealing ring includes a seal. The seal forms a water-tight barrier between the sealing ring and the vault and between the sealing ring and the WPT pad. The water-tight barrier forms a water-tight cover for the first junction box and the second junction box.

FIG. 1 is a schematic block diagram illustrating one embodiment of a wireless power transfer ("WPT") system 100 with a low voltage WPT pad. The WPT system 100 includes a power converter apparatus 104 and a secondary receiver apparatus 106 separated by a gap 108, and a load 110, which are described below.

The WPT system 100 includes a power converter apparatus 104 that receives power from a power source 112 and transmits power over a gap 108 to a secondary receiver apparatus 106, which transfers power to a load 110. The power converter apparatus 104, in one embodiment, may be called a switching power converter and includes a converter 118 that receives a direct current ("DC") voltage from a DC bus 116. In some embodiments, the converter 118 is a resonant converter. In other embodiments, the converter 118 is a switching power converter that is not a resonant converter. For example, the converter 118 is an inverter and produces an alternating current ("AC") waveform that feeds the primary pad 126.

In one embodiment, the power source 112 provides DC power to the DC bus 116. In another embodiment, the power source 112 is an AC power source, for example from a building power system, from a utility, from a generator, etc. and the power converter apparatus 104 includes a form of rectification to provide DC power to the DC bus 116. For example, the rectification may be in the form of a power factor correction and rectification circuit 114. In the embodiment, the power factor correction and rectification circuit 114 may include an active power factor correction circuit, such as a switching power converter. In other embodiments, the power factor correction circuit is passive. The power factor correction and rectification circuit 114 may also include a full-bridge, a half-bridge rectifier, or other rectification circuit that may include diodes, capacitors, surge suppression, etc.

The converter 118 may be controlled by a primary controller 120, which may vary parameters within the converter 118, such as conduction time, conduction angle, duty cycle, switching, etc. The primary controller 120 may receive information from sensors and position detection 122 within or associated with the power converter apparatus 104. The primary controller 120 may also receive information wirelessly from the secondary receiver apparatus 106.

The power converter apparatus 104 includes a primary pad 126 (i.e. a primary WPT pad) that receives power from the converter 118. In the depicted embodiment, the primary pad 126 includes four windings, which may also be termed "pads." To support the windings, the power converter apparatus 104 may include multiple converters 118. In one embodiment, portions of the converter 118 and primary pad 126 form a resonant circuit that enables efficient wireless power transfer across the gap 108. In another embodiment, the power converter apparatus 104 includes a switching power converter that is not a converter. The gap 108, in some embodiments includes an air gap, but may also partially or totally include other substances. For example, where the primary pad 126 is in a roadway, the gap 108 may include a resin, asphalt, concrete or other material just over the windings of the primary pad 126 in addition to air, snow, water, etc. between the primary pad 126 and a secondary pad 128 located in the secondary receiver apparatus 106.

The secondary receiver apparatus 106 includes a secondary pad 128 (i.e. a secondary WPT pad) connected to a secondary circuit 130 that delivers power to the load 110. In the depicted embodiment, the secondary pad 128 may include multiple windings, which may also be termed "pads." Each winding may feed a separate secondary circuit 130. The secondary receiver apparatus 106 may also include a secondary decoupling controller 132 that controls the secondary circuit 130 and may also be in communication with sensors and/or position detection 136 and wireless communications 134 coupled to the power converter apparatus 104.

In one embodiment, the secondary receiver apparatus 106 and load 110 are part of a vehicle 140 that receives power from the power converter apparatus 104. The load 110 may include a battery 138, a motor, a resistive load, a circuit or other electrical load. For example, the WPT system 100 may transfer power to a portable device with a computer, to a consumer electronic device, to an industrial load, or other portable load that would benefit from receiving power wirelessly wherein the primary pad 126 is mounted in a vault.

In one embodiment, the secondary circuit 130 includes a portion of resonant circuit that interacts with the secondary pad 128 and that is designed to receive power at a resonant frequency. In another embodiment, the secondary circuit 130 includes a power conditioning circuit that is not a resonant circuit. The secondary circuit 130 may also include a rectification circuit, such as a full-bridge rectifier, a half-bridge rectifier, and the like. In another embodiment, the secondary circuit 130 includes a power converter of some type that receives power from the resonant circuit/rectifier and actively controls power to the load 110. For example, the secondary circuit 130 may include a switching power converter. In another embodiment, the secondary circuit 130 includes passive components and power to the load 110 is controlled by adjusting power in the power converter apparatus 104. In another embodiment, the secondary circuit 130 includes an active rectifier circuit that may receive and transmit power. One of skill in the art will recognize other forms of a secondary circuit 130 appropriate for receiving power from the secondary pad 128 and delivering power to the load 110.

The converter 118, in one embodiment, includes an active switching section coupled to a resonant circuit formed with components of the converter 118 and the primary pad 126. The converter 118 is described in more detail with regard to FIGS. 2A and 2B.

Figure 2A:
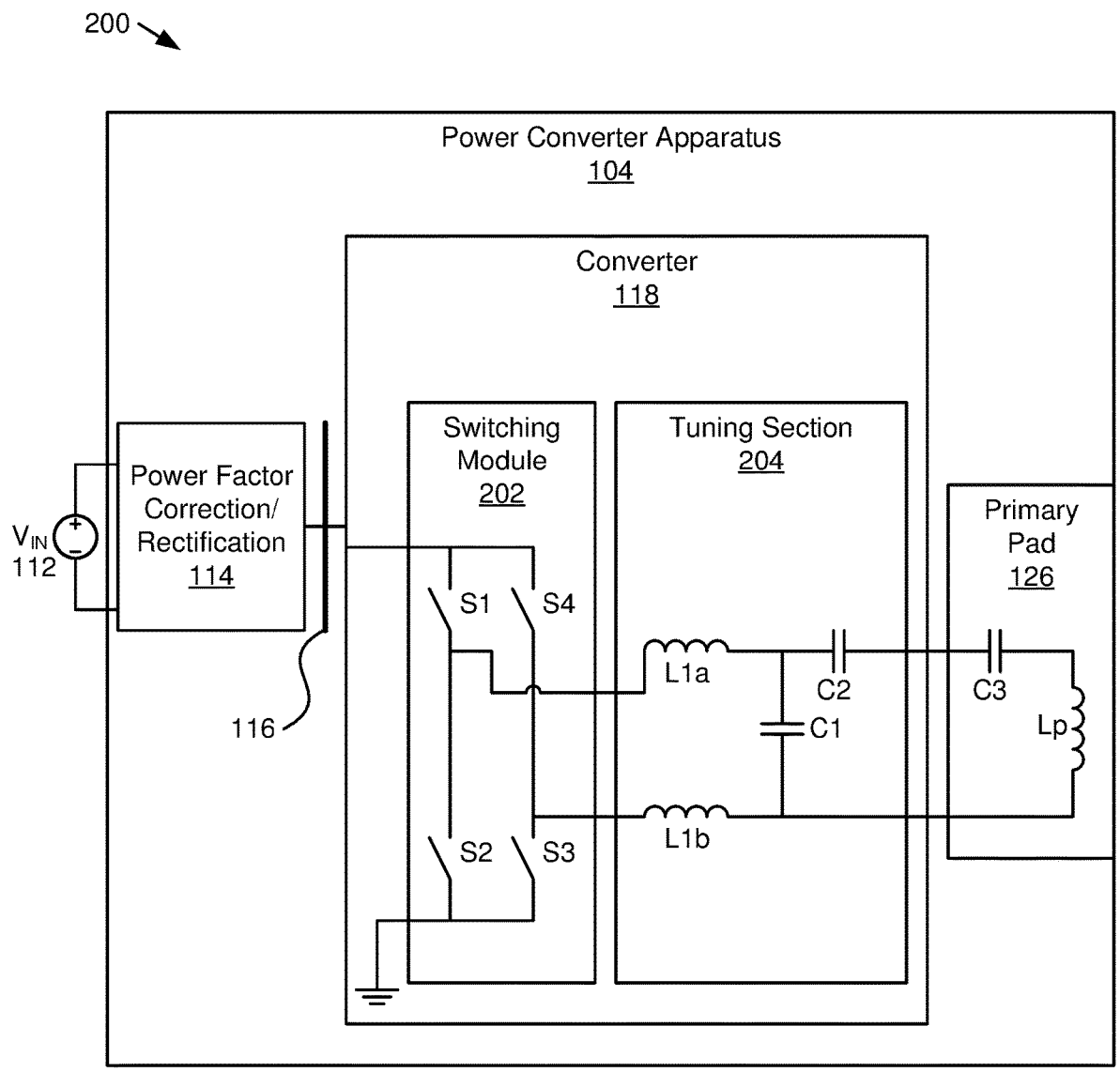
FIG. 2A is a schematic block diagram illustrating one embodiment of a power converter apparatus.

FIG. 2A is a schematic block diagram illustrating one embodiment 200 of a power converter apparatus 104. The power converter apparatus 104 is connected to a power source 112 and includes a power factor correction and rectification circuit 114 connected to a DC bus 116 feeding a converter 118 connected to a primary pad 126 as described with regard to the WPT system 100 of FIG. 1.

The converter 118 includes a switching module 202 and a tuning section 204. In one embodiment, the switching module 202 includes four switches configured to connect the DC bus 116 and to ground. Typically, switches S1 and S3 close while switches S2 and S4 are open and vice-versa. When switches S1 and S3 are closed, the DC bus 116 is connected to a positive connection of the tuning section 204 through inductor L1$a$ and the ground is connected to the negative connection of the tuning section 204 through inductor L1$b$ while switches S2 and S4 are open. When switches S2 and S4 are closed, the ground is connected to the positive terminal of the tuning section 204 and the DC bus 116 is connected to the positive connection of the tuning section 204. Thus, the switching module alternates connection of the DC bus 116 and ground to the tuning section 204 simulating an AC waveform. The AC waveform is typically imperfect due to harmonics.

Typically, switches S1-S4 are semiconductor switches, such as a metal-oxide-semiconductor field-effect transistor ("MOSFET"), a junction gate field-effect transistor ("JFET"), a bipolar junction transistor ("BJT"), an insulated-gate bipolar transistor ("IGBT") or the like. Often the switches S1-S4 include a body diode that conducts when a negative voltage is applied. In some embodiments, the timing of opening and closing switches S1-S4 are varied to achieve various modes of operations, such as zero-voltage switching, various power levels, etc.

The tuning section 204 of the converter 118 and the primary pad 126 are designed based on a chosen topology. For example, the converter 118 and primary pad 126 may form an inductor-capacitor-inductor ("LCL") load resonant converter, a series resonant converter, a parallel resonant converter, and the like. The embodiment depicted in FIG. 2A includes an LCL load resonant converter.

Resonant converters include an inductance and capacitance that form a resonant frequency. When a switching frequency of the tuning section 204 is at or close to the resonant frequency, voltage with the tuning section 204 and primary pad 126 often increases to voltages levels higher than the voltage of the DC bus 116. For example, if the voltage of the DC bus 116 is 1 kilovolt ("kV"), voltage in the tuning section 204 and converter 118 may be 3 kV or higher. The high voltages require component ratings, insulation ratings, etc. to be high enough for expected voltages.

The primary pad 126 includes capacitor C3 and inductor Lp while the tuning section 204 includes series capacitor C2. Capacitors C2 and C3 add to provide a particular capacitance that forms a resonant frequency with inductor Lp. In some embodiments, the power converter apparatus 104 includes a single series capacitor in the tuning section 204 or in the primary pad 126. While FIG. 2A is focused on the converter 118 and primary pad 126, the secondary receiver apparatus 106 includes a secondary pad 128 and a secondary circuit 130 that typically includes a tuning section 204 where the inductance of the secondary pad 128 and capacitance of the tuning section 204 of the secondary circuit 130 form a resonant frequency and the secondary pad 128 and secondary circuit 130 have voltage issues similar to the primary pad 126 and converter 118. In other embodiments, the tuning section 204 and primary pad 126 are not designed to produce a resonance, but instead condition voltage from the switching module 202. For example, the tuning section 204 may filter out harmonic content without filtering a switching frequency.

Figure 2B:
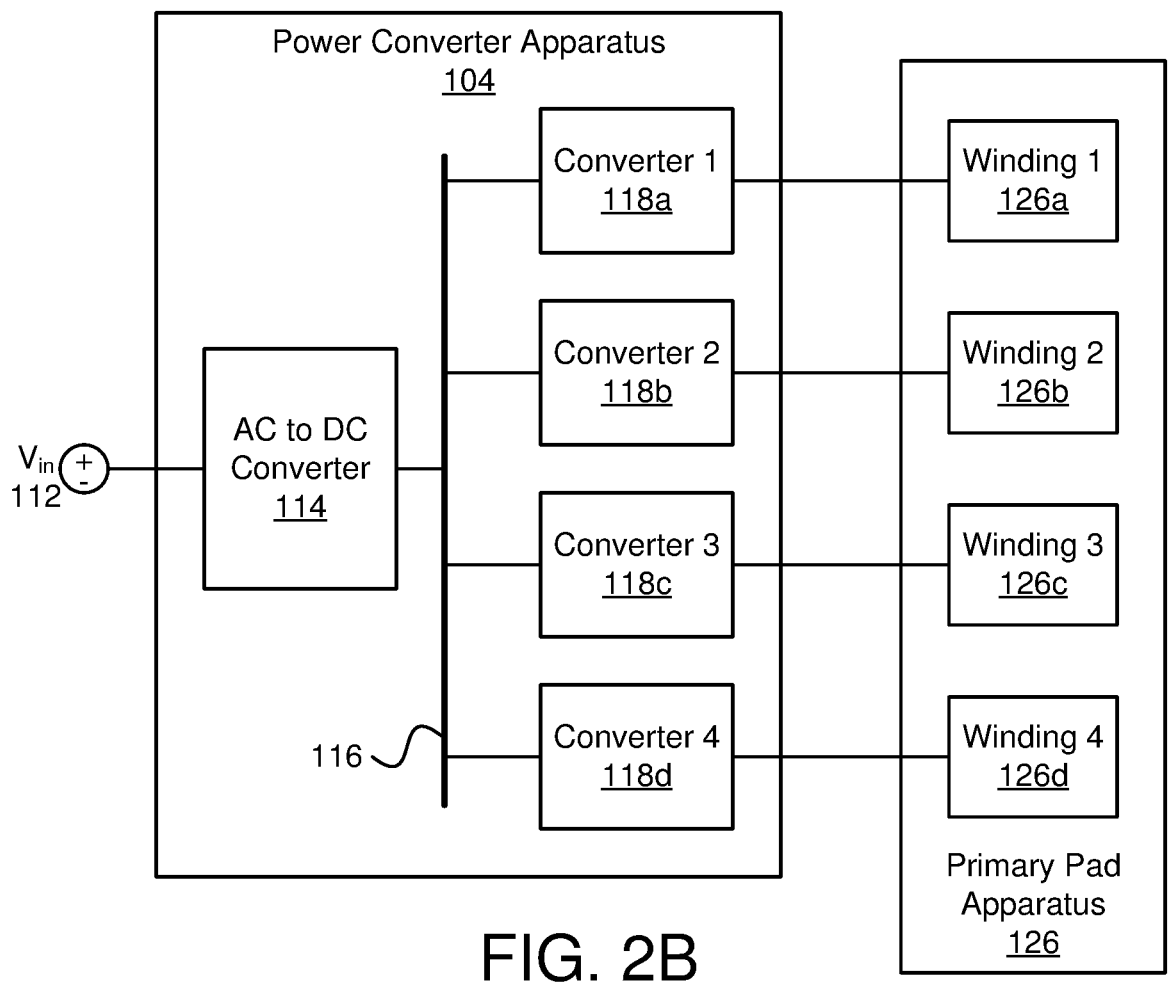
FIG. 2B is a schematic block diagram illustrating one embodiment of a power converter apparatus with multiple converters feeding windings of one or more WPT pads and/or windings.

FIG. 2B is a schematic block diagram illustrating one embodiment 201 of a power converter apparatus 104 with multiple converters 118a-d feeding windings 126a-d of one or more primary pads 126. FIG. 2B is presented in a one-line diagram format. One of skill in the art will recognize that each line between elements represents two or more conductors. The power source 112, power factor correction and rectification circuit 114 and DC bus 116 are substantially similar to those described in the embodiment 200 of FIG. 2A. The power converter apparatus 104 includes four converters 118a-d (generically or individually "118") where each converter 118 includes a switching module 202 and may include a tuning section 204. Other embodiments may include more or less converters 118. Each converter 118 feed a winding (e.g. 126a) of a primary pad 126, which may include multiple windings 126a-d. A converter (e.g. 118a) may feed an individual primary pad 126.

Figure 3:
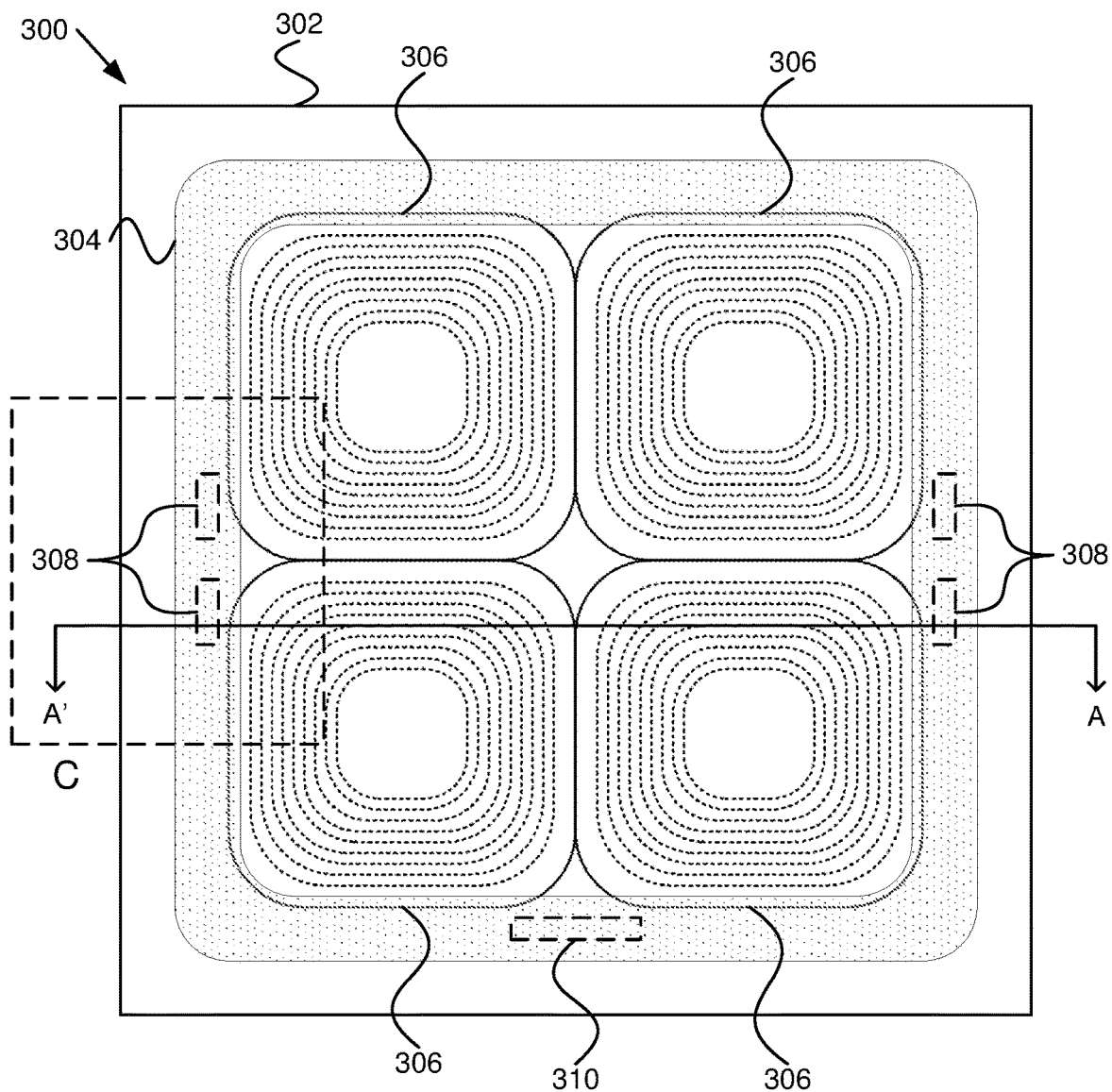
FIG. 3 is a schematic block diagram illustrating one embodiment of a vault assembly of a WPT pad with an integral junction box on a side.

FIG. 3 is a schematic block diagram illustrating one embodiment of a vault assembly 300 of a WPT pad 306 with an integral junction box 308 on a side. In one embodiment, the WPT pad 306 is a primary pad 126. In the embodiment, the vault assembly 300 includes a vault 302 with four WPT pads 306 and a sealing ring 304 that secures the WPT pads 306 to the vault 302. The vault 302 also includes one or more junction boxes 308 located under the sealing ring 304. The junction boxes 308 are sized and located to accommodate termination of conductors from the converters 118 and from the WPT pads 306. Locating the junction boxes near the WPT pads 306 is beneficial so that the WPT pads 306 do not have to be shipped with long leads that may be damaged. The WPT pads 306 may be large and heavy and a large bundle of conductors coming from the WPT pads 306 is inconvenient and easily damaged. In addition, locating the junction boxes 308 under a sealing ring 304 allows the sealing ring 304 to serve multiple purposes.

In one embodiment, the vault 302 includes a junction box 308 for each WPT pad 306. In another embodiment, the vault 302 includes a junction box 308 that accommodates wiring from multiple WPT pads 306 (not shown). In another embodiment, the vault 302 includes a junction box 302 that is separated from an associated WPT pad 306 by a wall or divider. In another embodiment, the vault 302 includes a junction box 308 that is open on at least one side toward a WPT pad 306. In another embodiment, the vault 302 includes one or more additional spaces for other purposes. For example, the vault 302 may include a fluid connection box 310 that allows coupling of cooling coils within the WPT pad 306 with external cooling lines.

Figure 4:
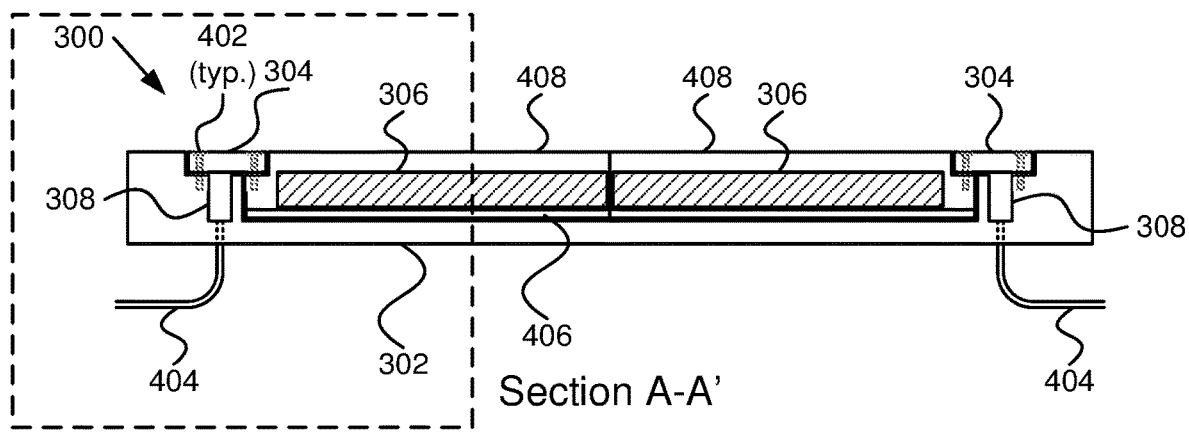
FIG. 4 is a schematic block diagram illustrating one embodiment of section view of the vault assembly of the WPT pad of FIG. 3.
Figure 5:
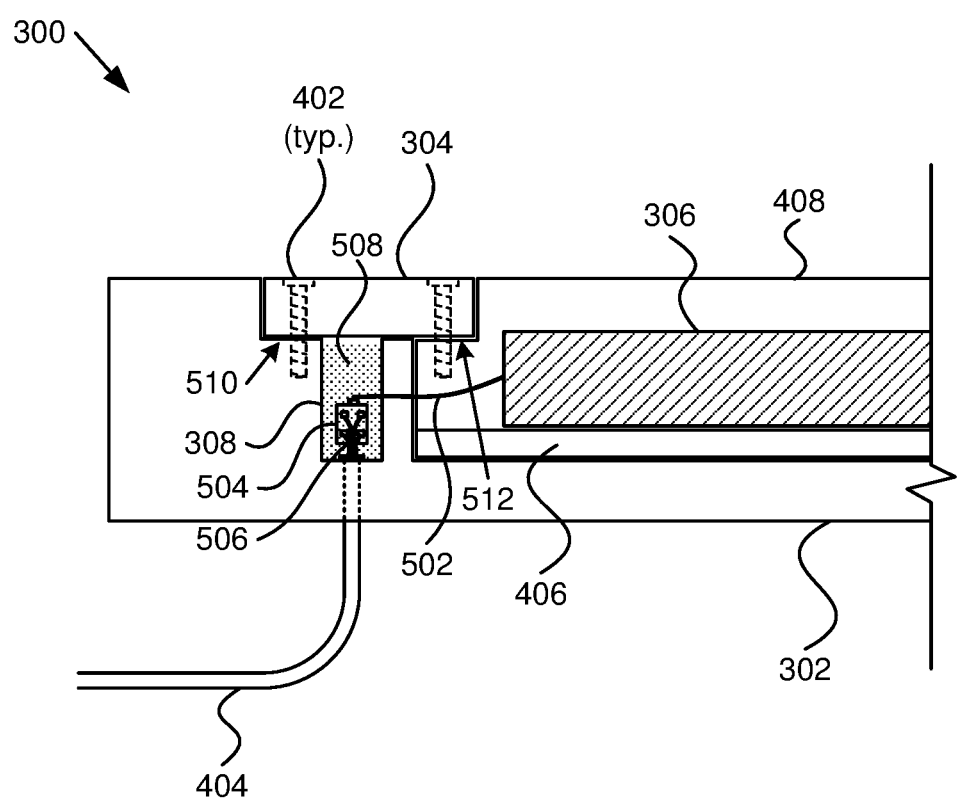
FIG. 5 is a schematic block diagram illustrating one embodiment an enlarged view of a portion of the section view of the vault assembly of FIG. 4.
Figure 6:
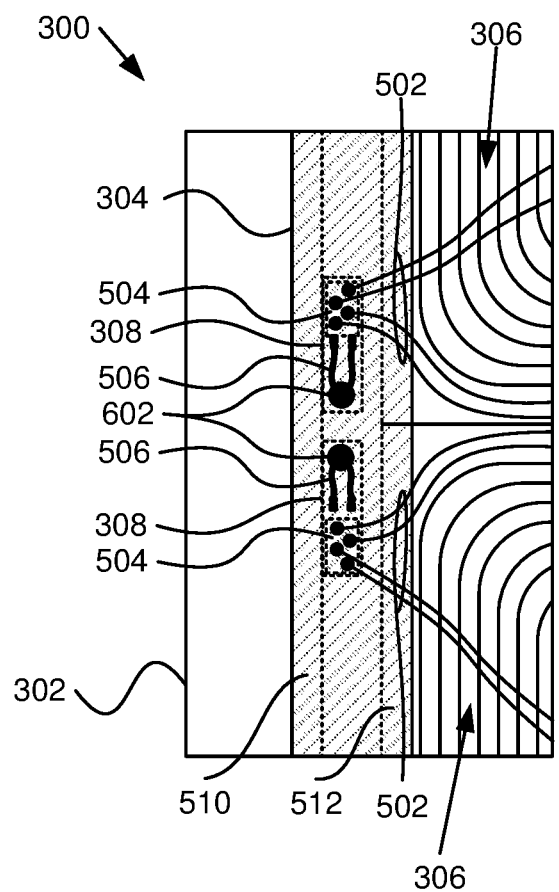
FIG. 6 is a schematic block diagram illustrating one embodiment of an enlarged view of a portion of the vault assembly of FIG. 3.

FIG. 4 is a schematic block diagram illustrating one embodiment of section view of the vault assembly 300 of FIG. 3. FIG. 4 is section A-A' of FIG. 3. FIG. 5 is a schematic block diagram illustrating one embodiment an enlarged view of a portion B of the section view of the vault assembly 300 of FIG. 4. FIG. 6 is a schematic block diagram illustrating one embodiment of an enlarged view of a portion C of the vault assembly 300 of FIG. 3.

The WPT pads 306 fit into the vault 302 in a recess shaped for the WPT pads 306. Each WPT pad 306, in the embodiment, includes a plate 406 underneath the WPT pad 306. The plate 406, in some embodiments, serves to reduce electromagnetic waveforms directed toward the plate 406. Each WPT pad 306 is an encapsulated WPT pad 408 with a resin or other material surrounding windings of the WPT pad 306. In the depicted embodiment, the sealing ring 304 fits over a ledge 512 in the encapsulating material of the WPT pad 306 and over a ledge 510 in the vault 302. Fasteners 402, such as screws, bolts, etc. retain the sealing ring 304 in place, which holds the WPT pad 306 within the vault 302. A conduit 404, in some embodiments, enters the junction box 308. Typically, the conduit 404 carries conductors from a primary circuit, for example, from converters 118 where used.

The junction box 308 is depicted under the sealing ring 304 and the sealing ring 304 is depicted having a typically uniform width. In other embodiments, the sealing ring 304 is shaped differently and may be wider at the junction box 308 than at other locations around the WPT pads 306. In one embodiment, a wall or side of the junction box 308 is between the junction box 308 and the WPT pad 306. In another embodiment, encapsulation material and/or windings of an encapsulated WPT pad 408 are recessed to fit around a junction box 308. In another embodiment, a junction box 308 is formed by a void formed between the vault 302 and WPT pad 306. One of skill in the art will recognize other ways to include a junction box 308 at a side of a WPT pad 306 in a vault 302. Having a junction box 308 under a sealing ring 304 is beneficial so that a separate cover is not needed for the junction box 308. A separate cover may need to meet additional requirements and may be classified differently by a governmental authority or other authority having jurisdiction over installation of the vault so having a sealing ring 304 cover the junction box 308 is beneficial.

As depicted in FIG. 5, the junction box 308, in some embodiments includes a terminal block 504. The terminal block 504 includes landing positions for winding conductors 502 and conductors 506 from the converter 118. The landing positions may be lugs, bolts, etc. and the conductors 502, 506 may be terminated in a way to mate to the lugs, bolts, etc. of the terminal block 504. In one embodiment, the junction box 308 is filled with a material 508 that encapsulates the terminal block 504 and conductors 502, 506, such as a dielectric grease, silicone grease, or other insulative material. For example, the material 508 may prevent liquid from contacting the terminal block 504 or conductors 502, 506. The material 508, in one embodiment, has a consistency capable of surrounding the terminal block 504 and/or conductors 502, 506, provides insulation, and repels water and other liquids. One of skill in the art will recognize suitable substances for a material 508 to be placed in the junction box 308 to surround the terminal block 504 and/or conductors 502, 506.

In other embodiments, other means are used to prevent liquid from filling the junction boxes 308, fluid connection box 310 and/or recesses for the WPT pads 308. For example, the junction boxes 308, fluid connection box 310 and/or recesses for the WPT pads 308 may include a drainage pipe, opening, etc. In some embodiments, an area below the vault 302 may be filled with course gravel or other material suitable for drainage of liquid from the vault 302. In another embodiment, the vault 302 is sealed using the sealing ring 304, with O-rings, gaskets, etc. to prevent water or other liquids from entering. The sealing ring 304, gaskets, etc. may be sufficient for keeping dry the WPT pad 306, junction boxes 308, fluid connection box 310, etc. Other embodiments may include both means for sealing the vault 302, such as O-rings, gaskets, etc. as well as a drainage system. Note that the O-ring, gaskets, etc. are not depicted for clarity, but one of skill in the art will recognize that sealing means, such as O-rings, gaskets, silicon seal, gasket forming material, etc. may be used between the sealing ring 304 and the vault 302 and/or WPT pads 306.

FIG. 6 depicts a conduit entry point in each junction box 308 with conductors 506 emerging from each conduit 404. The terminal block 504 is oriented so that conductors 506 from the converters 118 or other primary system component are terminated on a side of the terminal block 504 and then conductors 502 from the windings of the WPT pads 306 terminate on the top of the terminal block 504. One of skill in the art will recognize other terminal block configurations. The terminal blocks 504, in some embodiments are secured to the sides or bottom of the junction boxes 306. Conductors 502 from the WPT pads 306, in some embodiments, are sealed as they penetrate the junction boxes 306.

Figure 7:
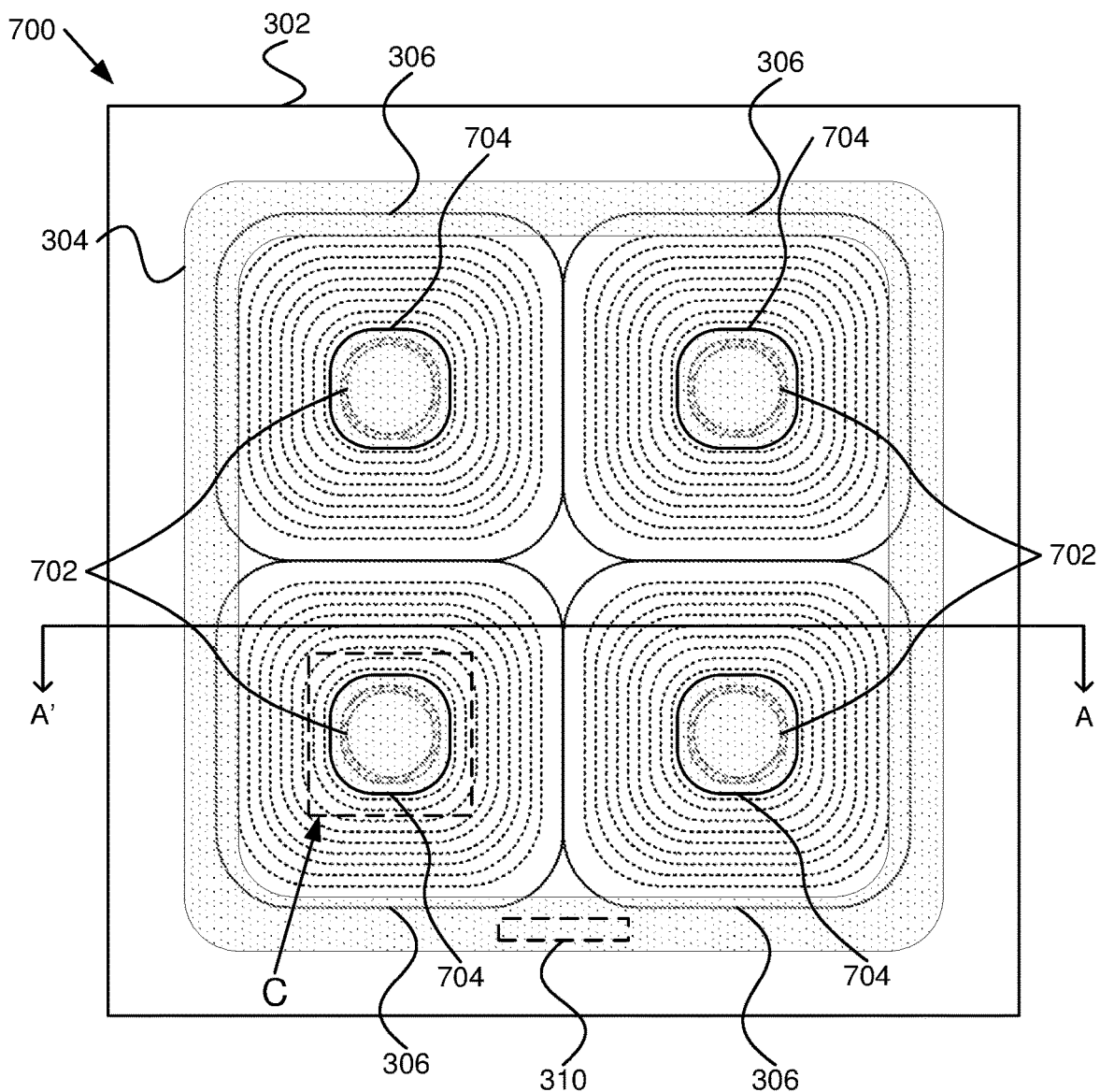
FIG. 7 is a schematic block diagram illustrating one embodiment of a vault assembly with an integral junction box in the center of each WPT pad.
Figure 8:
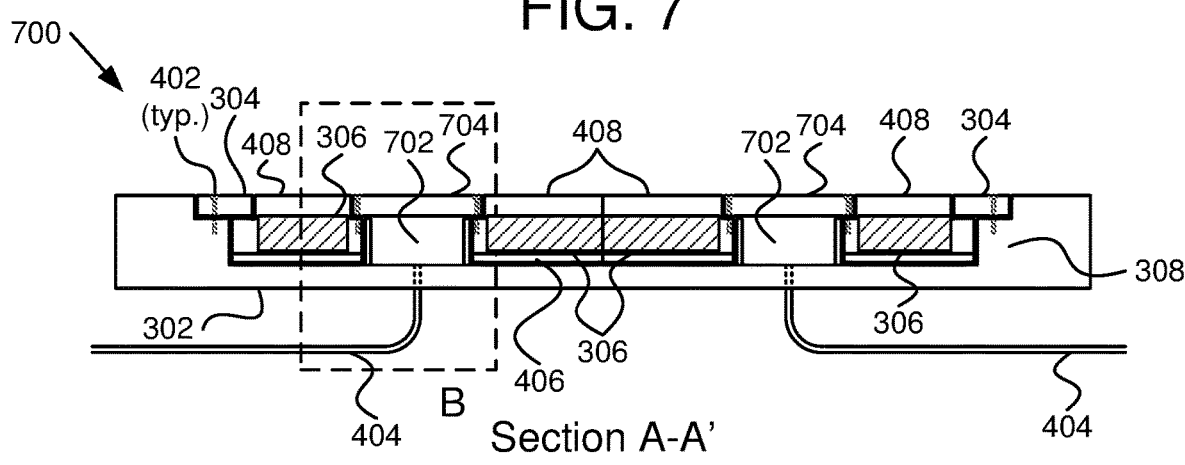
FIG. 8 is a schematic block diagram illustrating one embodiment of section view of the vault assembly of FIG. 7.
Figure 9:
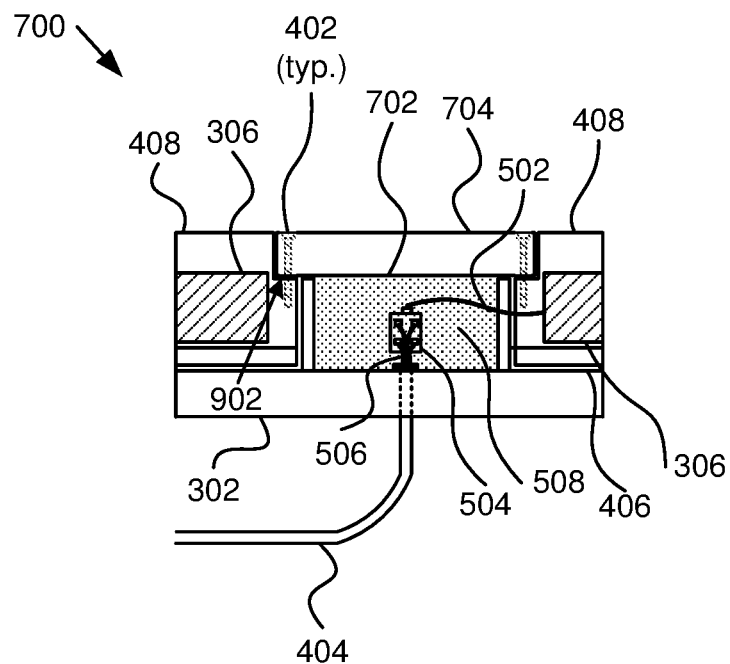
FIG. 9 is a schematic block diagram illustrating one embodiment an enlarged view of a portion of the section view of the vault assembly of FIG. 8.
Figure 10:
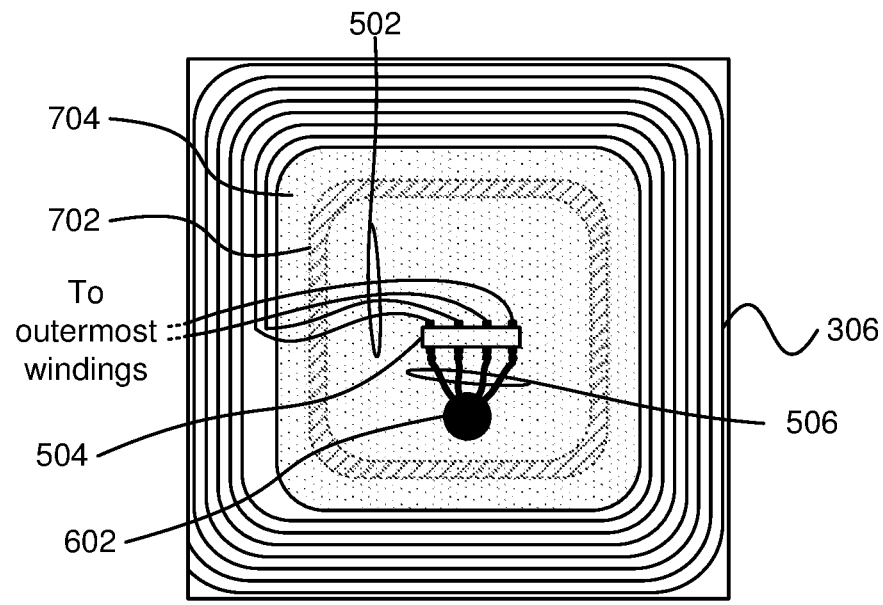
FIG. 10 is a schematic block diagram illustrating one embodiment of an enlarged view of a portion of the vault assembly of FIG. 7.

FIG. 7 is a schematic block diagram illustrating one embodiment of a vault assembly 700 with an integral junction box 702 in the center of each WPT pad 306. FIG. 8 is a schematic block diagram illustrating one embodiment of section view of the vault assembly 700 of FIG. 7. FIG. 8 is one embodiment of a section A-A' of FIG. 7. FIG. 9 is a schematic block diagram illustrating one embodiment an enlarged view of a portion B of the section view of the vault assembly 700 of FIG. 8 and FIG. 10 is a schematic block diagram illustrating one embodiment of an enlarged view of a portion C of the vault assembly of FIG. 7.

The vault assembly 700 of FIGS. 7-10 are similar to the vault assembly of FIGS. 3-6 except that junction boxes 702 are included in the center of the WPT pads 306. In the embodiment, a cover 704 fits over each junction box 702 and is secured to the WPT pads with fasteners 402. Conduit 404 enters the bottom of the junction boxes 702, but may also enter via a side of the junction boxes 702. In some embodiments, a ledge 902 of encapsulation material of the WPT pad 306 supports the cover 704 and fasteners secure the cover 704 to the WPT pad 306. In other embodiments, windings of the WPT pad 306 extend under the ledge 902 of the WPT pad 306. In some embodiments, the junction boxes 702 in the center of the WPT pads 306 are in addition to one or more junction boxes 308, 310 outside the WPT pads 306.

FIG. 9 depicts the junction box 702 with a terminal block 504 and conductors 502, 506 from the WPT pad 306 and primary system, for example from a converter 118. The junction box 702 may also be filled with a material 508 that prevents liquid from contacting the terminal block 504 and conductors 502, 506, such as a dielectric grease. FIGS. 9 and 10 depicts a junction box 702 with a wall dividing the junction box 702 from the WPT pads 306. The walls may be part of the vault 302. The bottom of the junction box 308, in the embodiment, may be part of the vault 302.

In other embodiments, the center of the WPT pad 306 forms the junction box 702. For example, where the WPT pad 306 is encapsulated, the encapsulation material may form the walls of the WPT pad 306. In the embodiment, a bottom of a recess of the vault 302 for the WPT pads 306 forms the bottom of the junction box 702. In another embodiment, the plate 406 may form a bottom of the junction box 702. The plate 406, in some embodiments, is an electromagnetic shield and may be metal or other suitable material.

FIG. 10 depicts a conduit entry point 602, which may be located in a convenient location within the junction box 702. Conductors 506 emerging from the conduit 404 terminate on the terminal block 504 and well as conductors 502 from the windings of the WPT pad 306. While a square shape for the junction box 702 is depicted, other junction box shapes are contemplated and may depend on a shape of windings of the WPT pad 306.

PARTS LIST

100 Wireless power transfer ("WPT") system
104 Power converter apparatus
106 Secondary receiver apparatus
108 Gap
110 Load
112 Power supply
114 Power factor correction and/or rectification
116 DC voltage bus
118 Converter
118$a$ Converter 1
118$b$ Converter 2
118$c$ Converter 3
118$d$ Converter 4
120 Primary controller
122 Sensor/position detection
124 Wireless communications—primary
126 Primary pad
126$a$ Winding 1
126$b$ Winding 2
126$c$ Winding 3
126$d$ Winding 4
128 Secondary pad 130 Secondary circuit
132 Secondary controller
134 Wireless communications—secondary
138 Battery
140 Vehicle
200 Primary apparatus
201 Primary apparatus—alternate embodiment
202 Switching module
204 Tuning section
300 Vault assembly for WPT pads with integral junction box on side
302 Vault for WPT pads
304 Sealing ring
306 WPT pad
308 Junction box
310 Fluid connection box
402 Fastener
404 Conduit
406 Plate
408 Encapsulated WPT pad
502 Winding conductor
504 Terminal block
506 Conductor to converter
508 Dielectric grease
510 Ledge of vault for sealing ring
512 Ledge of WPT pad
602 Conduit entry point
700 Vault assembly for WPT pads with integral junction box in center of WPT pad
702 Junction box in center of WPT pad
704 Cover for junction box
902 Ledge of WPT pad The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vault apparatus comprising:
a vault comprising an opening for a wireless power transfer ("WPT") pad, the opening located on a top of the vault;
a junction box formed into the vault, the junction box comprising an opening oriented toward the top of the vault, the junction box comprising a conduit entry point; and
a sealing ring that maintains a WPT pad fixed in the vault, wherein a portion of the sealing ring covers the junction box.

2. The vault apparatus of claim 1, wherein the junction box comprises a conduit entry point located on a side of the junction box.

3. The vault apparatus of claim 1, wherein the junction box comprises a terminal block with a landing lug for a conductor from the WPT pad and a landing lug for a conductor entering the junction box through a conduit entering the junction box.

4. The vault apparatus of claim 1, wherein the vault comprises a ledge under the sealing ring, the ledge supporting the sealing ring, the sealing ring comprising a seal, the seal forming a water-tight barrier between the sealing ring and the vault.

5. The vault apparatus of claim 1, wherein the portion of the sealing ring that covers the junction box extends between a ledge of the vault and the WPT pad.

6. The vault apparatus of claim 1, wherein the junction box further comprises a dielectric grease, the dielectric grease filling the junction box and filling space around components within the junction box.

7. The vault apparatus of claim 6, wherein the dielectric grease insulates electrified components within the junction box.

8. The vault apparatus of claim 6, wherein the dielectric grease is water repellent and repels water from reaching electrical components within the junction box surrounded by the dielectric grease.

9. The vault apparatus of claim 1, wherein the vault further comprises a second junction box that accommodates a cooling fluid connection between cooling lines of the WPT pad and supply and return lines connected to the cooling lines of the WPT pad.

10. The vault apparatus of claim 1, wherein when the WPT pad is mounted in the vault and the sealing ring is mounted to the vault and is maintaining the WPT pad within the vault, a rating for vehicular traffic over the vault, WPT pad and sealing ring comprises an American Association of State Highway and Transportation Officials ("AASHTO") H-20 rating for heavy duty vehicular traffic.

11. The vault apparatus of claim 1, wherein a portion of the WPT pad is flush with a top surface of the vault and the WPT pad comprises a recess and the sealing ring conforms to the recess, the sealing ring in the recess securing the WPT pad in the vault.

12. The vault of claim 11, further comprising a seal between the WPT pad and the sealing ring, the seal inhibiting liquid from entering the vault and forming a water-tight barrier between the sealing ring and the WPT pad.

13. The vault of claim 11, wherein a top portion of the sealing ring is flush with the top surface of the vault.

14. The apparatus of claim 1, further comprising a center junction box located in a center portion of a winding of the WPT pad, the center junction box terminating one or more conductors of the WPT pad and conductors from a conduit coupled to the center junction box.

15. A system comprising:
a wireless power transfer ("WPT") pad; and
a vault comprising:
an opening for the WPT pad, the opening located on a top of the vault; and
a junction box formed into the vault, the junction box comprising an opening oriented toward the top of the vault, the junction box comprising a conduit entry point; and
a sealing ring that maintains the WPT pad fixed in the vault, wherein a portion of the sealing ring covers the junction box.

16. The system of claim 15, wherein the vault further comprises a second junction box that accommodates a cooling fluid connection between cooling lines of the WPT pad and supply and return lines connected to the cooling lines of the WPT pad.

17. The system of claim 15, further comprising one or more of a converter, a power factor correction circuit, a rectification section and a direct current ("DC") bus, wherein the converter feeds the WPT pad.

18. The system of claim 15, wherein the WPT pad comprises a primary pad and further comprising a secondary receiver apparatus comprising a secondary pad, the secondary receiver apparatus connected to a load, wherein the system transfers power wirelessly from the primary pad to the secondary pad and delivers electrical power to the load.

19. A vault apparatus comprising:
- a vault comprising an opening for a wireless power transfer ("WPT") pad, the opening located on a top of the vault;
- a first junction box formed into the vault, the first junction box comprising an opening oriented toward the top of the vault, the first junction box terminating one or more conductors of the WPT pad and conductors from a conduit coupled to the first junction box;
- a second junction box that accommodates a cooling fluid connection between cooling lines of the WPT pad and supply and return lines connected to the cooling lines of the WPT pad; and
- a sealing ring that maintains a WPT pad fixed in the vault, wherein a portion of the sealing ring covers the first junction box and the second junction box.

20. The vault apparatus of claim 19, wherein the vault comprises a ledge under the sealing ring, the ledge supporting the sealing ring, the sealing ring comprising a seal, the seal forming a water-tight barrier between the sealing ring and the vault and between the sealing ring and the WPT pad, wherein the water-tight barrier forms a water-tight cover for the first junction box and the second junction box.

* * * * *